April 18, 1939.  C. E. PIERCE  2,154,582
SPLIT STRAIGHTENING ARBOR
Filed Feb. 21, 1938
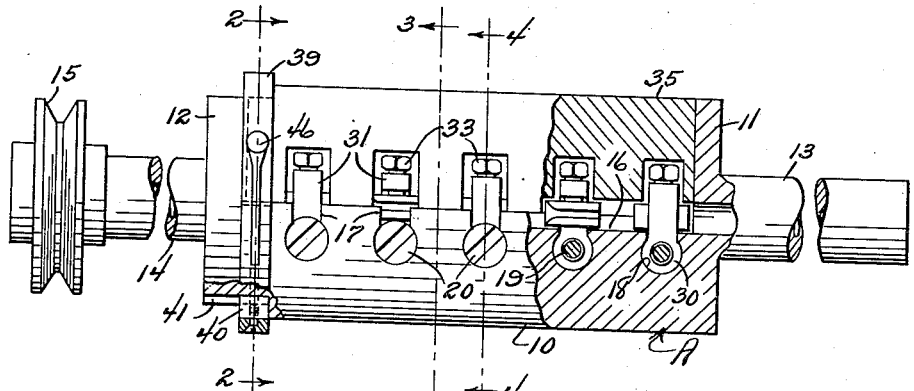
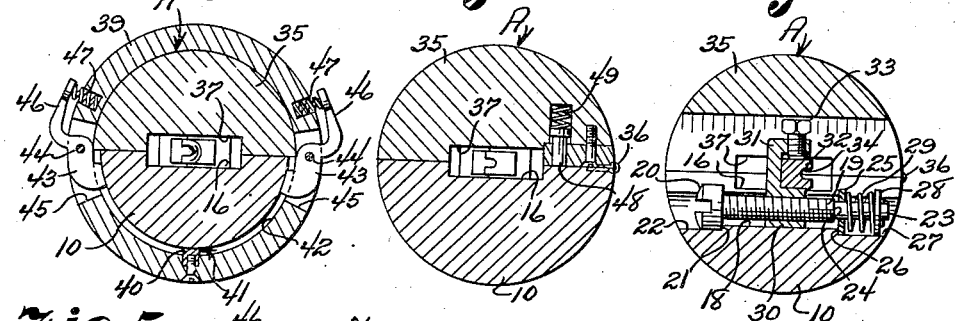
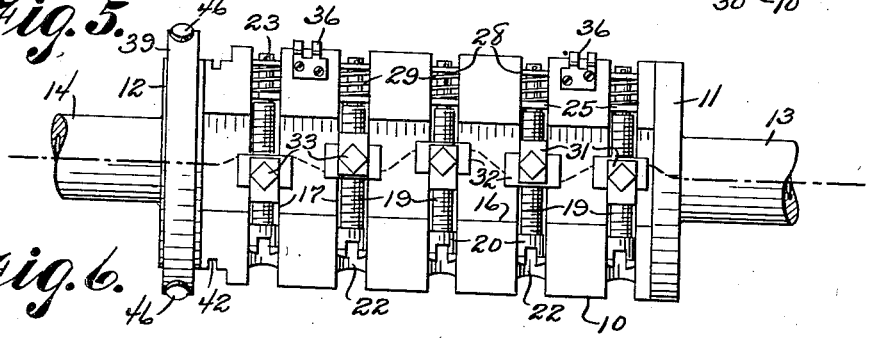
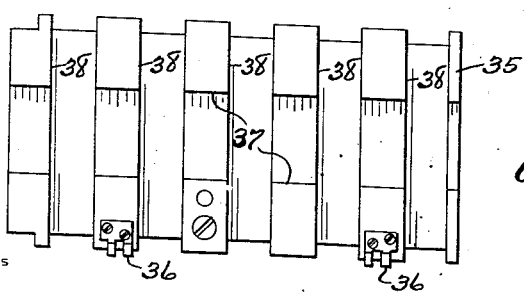
Charles E. Pierce
INVENTOR
BY Victor J. Evans & Co.
ATTORNEYS Patented Apr. 18, 1939

2,154,582

UNITED STATES PATENT OFFICE 2,154,582

SPLIT STRAIGHTENING ARBOR

Charles E. Pierce, Syracuse, N. Y.

Application February 21, 1938, Serial No. 191,817

5 Claims. (Cl. 153—37)

This invention relates to straightening arbors for wire, flexible rods and the like, and more particularly to an arbor of the adjustable type.

The principal object of the invention is to provide for opening the arbor body to facilitate the threading of the wire therethrough and for the purposes of inspection and replacement of the dies and also the easy removal of broken pieces of wire.

Another object is to minimize the number of parts and produce a more compact yet practical and efficient device.

A further object is to eliminate all outer surface projections on the arbor body so as to avoid injury to the operator.

With these and other objects in view the invention consists in the novel structure and in the parts, combinations and arrangements of parts as hereinafter described and pointed out with particularity in the appended claims and in connection with the accompanying drawing illustrating a practical adaptation of the invention, in which, Figure 1 is a view of the arbor, partly in side elevation and partly in longitudinal section;

Figure 2 is a section on the line 2—2 of Figure 1;

Figure 3 is a section on the line 3—3 of Figure 1;

Figure 4 is a section on the line 4—4 of Figure 1;

Figure 5 is a view of the arbor at right angles to that shown in Figure 1 and with the hinged complemental body member removed; and Figure 6 is an inner face view of the detached hinged complemental body member.

Referring now to the drawing, the letter A designates generally the arbor body, the intermediate portion 10 of which is semi-cylindrical. The opposite end portions of the arbor body are fully cylindrical as at 11 and 12, respectively. At the end of the portion 11 is an axial tubular shaft extension 13, while at the end of the opposite portion 12 is a similar shaft extension 14 on which is provided a driving pulley 15.

Extending longitudinally of the flat inner side of the body portion 10 is a rectangular channel 16 which is open at its opposite ends to communication with the bores of said tubular shaft extensions 13 and 14. Extending transversely of the body member 10 are open-ended passageways 17 in the form of rectangular slots, said passages 17 intersecting the longitudinal channel 16 and opening lengthwise at their bottoms into cylindrical bores 18.

Located in each of the transverse bores 18 of the body 10 is a screw element 19 having a slotted head 20 abutting a shoulder 21 formed at the inner end of a counter-bore 22 of the bore 18. The opposite end portion of the screw 19 is reduced in diameter, as at 23, to provide a shoulder 24 to abut the inner face of a washer 25 through which the reduced portion 23 of the screw is projected. The washer 25 abuts a shoulder 26 formed at the inner end of a counter-bore 27 of the adjacent end portion of the bore 18, and between said washer 25 and a second washer 28 held in place by a cotterpin or the like at the outer end of the reduced portion 23 of the screw 19 a coiled spring 29 is interposed. The function of the spring 29 is to yieldably hold the washer 25 against the adjacent shoulder 26 and the screw 19 with its head 20 in engagement with the opposite shoulder 21 of the bore 18, whereby the screw is frictionally held against turning except when a screwdriver or like tool is applied to the slotted head for the purpose of forcibly turning it.

Fitted on the screw 19 is the hub portion 30 of a die support 31 which is recessed at one side to receive the die block or shoe 32. The die block or shoe 32 is of generally rectangular form and is held in place by a set screw 33. As shown, the die block is grooved longitudinally on its working face, as at 34, the bottom of the groove being curved longitudinally for the bending of the wire thereacross with comparative bluntness rather than acutely so as to permit the movement of the kinked wire therealong with minimized liability of breaking the wire.

The die blocks or shoes 32 are alternately arranged reversely and offset in staggered relation to each other on the respective screw elements 19 throughout the length of the body 10, and each die is independently and separately adjustable on its companion screw element, which latter is rotated in the bore 18 without endwise movement but causes the die holder 31 to move in either direction transversely of the body 10 according to the direction of rotation of the screw element.

A complemental semi-cylindrical body member 35 is hinged, as at 36, to one side of the body member 10 and it is provided with a rectangular longitudinal channel 37, which corresponds to the channel 16 of the body member 10, and intersecting said channel 37 are transverse channels 38 corresponding to the passages 17 of said body member 10, said channels 38 affording passageways for the accommodation and adjustment of the die holders 31.

In order to hold the hinged body portions 10 and 35 in closed position, the cylindrical end portion 12 of the body portion 10 is reduced in diameter and the adjacent end portion of the member 36 is correspondingly reduced circumferentially so as to be flush with the circumference of the portion 12, and sleeved on said portion 12 is a ring 39, said ring having an internal key or spline 40 which works in a longitudinal groove 41 in the body member 10 whereby said ring 39 is held against rotation on the member 10 but is permitted endwise movement thereon. By this arrangement, when the ring is moved onto the extreme end portion 12 of the body 10 the complemental member 35 is free to be moved to an open position on its hinges 36, but, obviously, when the ring is moved inwardly so as to cover the adjacent reduced end portion of the member 35 when the latter is in closed position, the two body members 10 and 35 are locked together.

To releasably hold the ring 39 in its locking position the body member 10 is grooved circumferentially as at 42 to receive latch members 43 which are hinged, as at 44, in openings 45 provided therefor at opposite sides of the ring 39, said latch members being provided with depressible extensions 46 which are spring-pressed, as at 47, whereby the latch members 43 are releasably held in the groove 42 when the ring is in locking position with respect to the body members 10 and 35.

Preferably, the body member 35 is provided with a spring-pressed plunger 48 which is normally urged by its spring 49 against the face of the opposite body member 10 whereby the two body members 10 and 35 are moved apart when the locking ring 39 is moved to release said body members. This facilitates the opening of the arbor, the full opening of the member 35 being effected manually by the operator after the partial opening is caused by the spring-pressed plunger 48. In the closed condition of the arbor this plunger device takes up all looseness and effectively prevents rattling and chattering.

From the foregoing it is apparent that access is readily had to the respective dies over which the wire is easily threaded and kinked in opposite directions by the relative staggered off-set arrangement of the several dies, and not only in the initial set-up and adjustment of the device but at any time it becomes necessary or is desired to make an inspection of the interior or to remove particles of the wire should it become broken within the device, as well as for the renewal of the dies.

The device of the present invention operates, in general, in the usual way of wire straighteners of the rotating arbor type; that is to say, a length of wire coming from a reel or spool, or any other source in which it is previously coiled, whereby to give the wire a curved set, or the wire being otherwise deformed from a desired straight set, such as being kinked, is threaded through the axial passageway of the arbor between the reversely disposed and staggered die elements within the arbor, whereby, upon either pushing or pulling the wire through the arbor during the rotation of the latter, the length of wire leaving the arbor is straightened. This is the general principle upon which devices of this character operate, the differences being more particularly in the specific construction and arrangement of the correlated parts.

In some devices the wire to be straightened is inserted endwise into one end of the axial passageway of the arbor, which process is difficult and troublesome because of the curved set of the wire and the alternately off-set or reversely staggered relation of the respective die elements, over and between which latter the wire must be threaded. The making of the body portion of the arbor of the present invention in openable or separable longitudinally divided half sections, in the region where the reversely off-set or staggered die elements are located and housed, overcomes the difficulties and disadvantages of the aforesaid threading operation and has the particular advantage of quickly reapplying the wire to be straightened when breakage of the wire occurs, as occasionally happens in the use of a machine of the character described, notwithstanding the special structural provision and the exercise of care and skill in operation.

Obviously, the structure admits of considerable modifications within the spirit and scope of the invention as defined by the appended claims. The invention, therefore, is not limited to the specific construction and arrangements shown in the accompanying drawing.

What is claimed is:

1. A wire straightening arbor comprising a semi-cylindrical body having complete cylindrical end portions, tubular shafts extending from the opposite ends of said body, one of said shafts having driving means thereon, said body having a longitudinal channel extending axially thereof and communicating with the bores of said tubular shafts, and transverse passageways intersecting said longitudinal channel, the respective transverse passageways opening throughout the length thereof into transverse bores thereneath, said transverse bores and communicating passageways being opened at their opposite ends to the outside of the body, screw elements fitted rotatably in said transverse bores, means for holding said screw elements against endwise movement during rotation thereof, die holders mounted on said screw elements whereby to be moved endwise of said elements when they are rotated, dies detachably mounted on said die holders, and a complemental semi-cylindrical body member hingedly attached along one longitudinal edge portion to the corresponding portion of the first mentioned body member, said complemental body member having a longitudinal channel and transverse intersecting passages corresponding to the longitudinal channel and transverse passages of said first mentioned body member for the accommodation and adjustment of the respective die holders with the dies thereon.

2. A wire straightening arbor comprising two semi-cylindrical body members hingedly attached longitudinally and forming a cylinder in their closed relation, means for locking said members in closed relation to each other, one of said members having tubular shaft extensions extending axially from its opposite ends, the meeting portions of said body members having longitudinal channels registering with each other in the closed position of the members for the passage of the wire longitudinally therethrough, said body members having transverse registered passageways intersecting their respective longitudinal channels, screw elements fitted rotatably in bores provided therefor in one of said body members, said bores opening lengthwise into the transverse passageways of the body member, means for holding said screw elements against endwise movement during rotation thereof, die holders mounted on said screw elements whereby to be moved endwise of said elements when the latter are rotated, said die holders extending into the transverse passageways of the complemental body member, and dies detachably mounted on said die holders, said dies coinciding with a diametrical line paralleling the transverse passageways of the body members but being separately adjustable in staggered relation to each other on opposite sides of a right angular diametrical line.

3. A wire straightening arbor comprising a body member having cylindrical opposite end portions, but being semi-cylindrical therebetween, shaft extensions extending axially from the opposite ends of said body member, said shaft extensions having axial bores therein, said body member having a rectangular longitudinal channel extending along its inner axial face and communicating at its ends with the bores of said shaft extensions, said body member having transverse bores open at their opposite ends to the outside of the body member, the bores being open throughout their length into transverse passages in the axial face of the body member and intersecting the longitudinal channel in the latter, screw elements mounted rotatably within said transverse bores, means for holding said screw elements against endwise movement during rotation thereof, die holders mounted on said screw elements and projected to operate in said longitudinal channel and transverse openings in the body member, dies detachably mounted on said die holders, said dies having grooved portions coincident with the plane of the axial inner face of said body member and being curved longitudinally of the body member in the same plane, and a complemental semi-cylindrical body member hingedly attached along one marginal portion to the corresponding marginal portion of the first mentioned body member, means for releasably locking the two body members in closed position, said complemental body member having a longitudinal channel and transverse intersecting passageways open at their opposite ends to the outside of the body and registering throughout their length with the longitudinal channel and transverse openings of the first mentioned body member.

4. A wire straightening arbor comprising a generally cylindrical body having axial shaft extensions at its opposite ends, said shaft extensions having axial bores, and said body being divided longitudinally and transversely of its axis, one of the body sections being semi-cylindrical throughout the extent thereof, the other body section being semi-cylindrical for a portion of its length intermediate its ends corresponding to the length of the semi-cylindrical section and its opposite end portions to which the shaft extensions are attached being fully cylindrical, one cylindrical end portion thereof being reduced in diameter and the adjacent end portion of said semi-cylindrical section being reduced circumferentially to the diameter of said reduced cylindrical portion, a ring sleeved on said reduced cylindrical portion of the second mentioned body section, means for permitting longitudinal movement of said ring without rotation on said reduced cylindrical portion of the body member, and means for releasably latching said ring in position surrounding the adjacent reduced end portions of both body sections.

5. A wire straightening arbor of general cylindrical form, comprising a body member having cylindrical opposite end portions and a semi-cylindrical elongated intermediate portion, and a complemental semi-cylindrical member of substantially the same length as the intermediate portion of the first described member, said two body members being hingedly attached together along one longitudinal marginal portion, means for releasably locking the two body sections in closed relation to each other, the first mentioned body member having tubular axial shaft extensions at its opposite ends, the meeting axial side portions of said two body members having registered longitudinal channels therein which are open at their opposite ends and communicate with the bores of said shaft extensions, said body members having coinciding transverse passages intersecting the longitudinal channels thereof, transverse bores in the first mentioned body section open at their ends to the outside of the body section and communicating throughout their respective lengths with the transverse passages of the body section, adjusting screws mounted rotatably in said bores without threaded engagement therewith, spring elements acting upon said screws to yieldably resist rotation thereof and normally hold them against endwise movement, die holders mounted on said screws and projected into said transverse passages and longitudinal channels of the body section, said die holders being moved endwise of the screws when the latter are rotated, and dies detachably mounted on said die holders, the respective dies being alternately arranged in reverse positions and in staggered relation.

CHARLES E. PIERCE.